Aug. 24, 1954     L. F. AM RHEIN     2,687,322
PIPE PULLING TOOL
Filed April 19, 1952
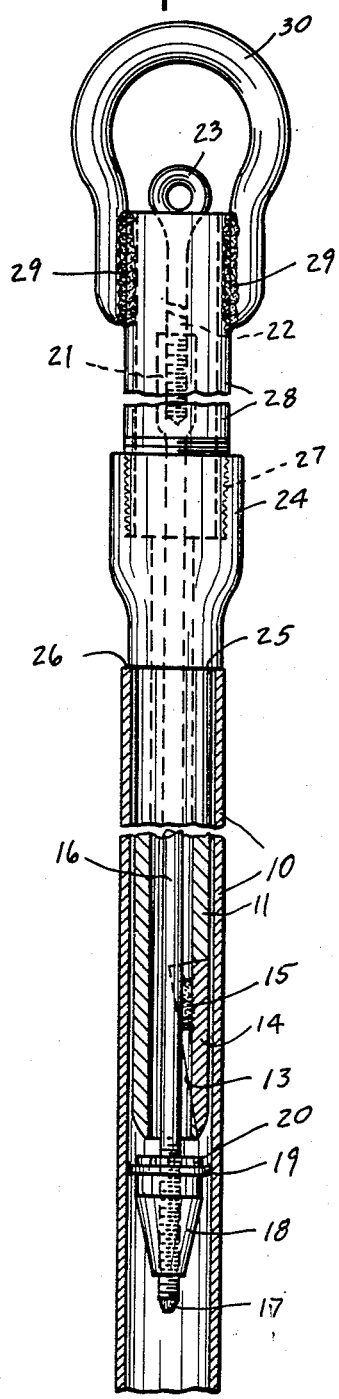
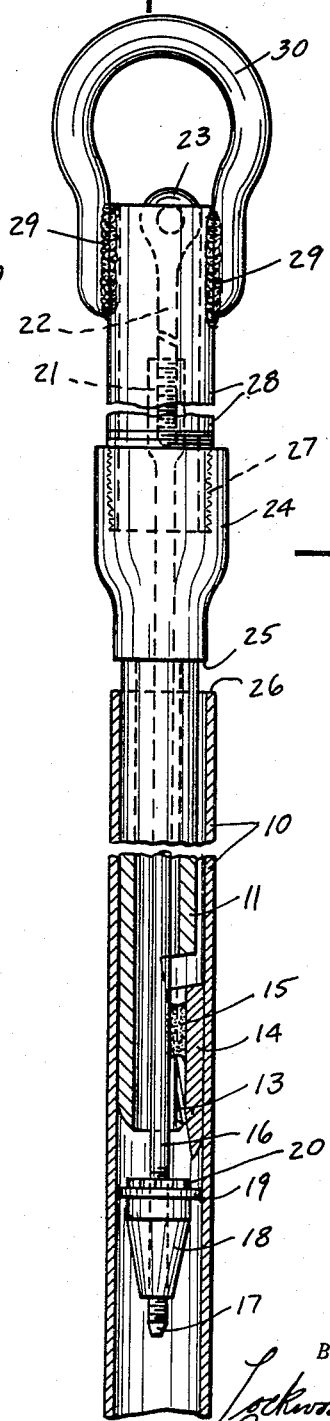
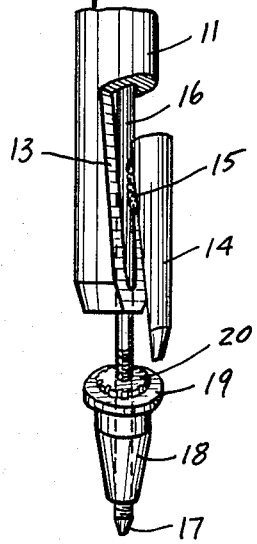
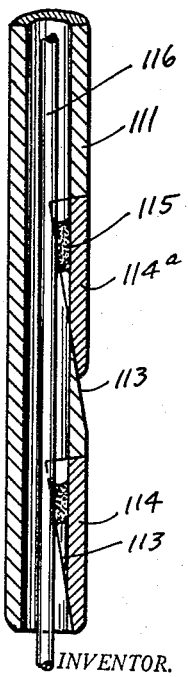
INVENTOR.
LEO F. AMRHEIN.
BY
Lockwood, Hahn, Galt & Woodard,
ATTORNEYS.

Patented Aug. 24, 1954

2,687,322

UNITED STATES PATENT OFFICE 2,687,322

PIPE PULLING TOOL

Leo F. Am Rhein, Greensburg, Ind.

Application April 19, 1952, Serial No. 283,226

2 Claims. (Cl. 294—96)

This invention relates to a pipe pulling tool.

It is the primary object of this invention to provide a tool for pulling out or extracting the pipe used in wells or the like. This is accomplished through the provision of longitudinally and outwardly movable wedges which grip the walls defining the bore of the pipe and thereby permit its removal from the well.

It is a further object of this invention to provide a tool of the above type which is characterized by its simplicity, low cost, ease of operation and sturdiness.

It is a still further object of the present invention to provide a tool which has gripping surfaces formed from a cut-out sector or quadrant of the wall of the tool itself. It is thus unnecessary to pre-form the wedge members and later size them in such manner that they will mate with or be complementary to the cut-out portion of the tool.

It is a still further object of the invention to provide a tool which will facilitate the location of pipe which may have become lost in a well during installation of a pump or the like.

The full nature of the invention will be understood from the accompanying drawings and the following description and claims:

Fig. 1 is a side elevation view partially in section of the invention shown disposed within a pipe.

Fig. 2 is a view similar to Fig. 1, with the wedge member shown in gripping position.

Fig. 3 is a perspective view of the lower end of the invention.

Fig. 4 is a section view of a portion of a modified form of the invention.

In the drawings a section of pipe that is to be extracted or removed from a well or the like is shown at 10. Insertable within the pipe in order to make possible its removal is the invention, the lower end of which is shown in Fig. 3. In that figure a tubular casing 11 is shown, it having a diameter slightly less than the diameter of the bore of the pipe to be removed. A portion of the lower end of the casing is cut out or angularly notched in such manner that cam surfaces 13 are formed by opposed walls of the casing. The cut-out portion, sector or quadrant 14 serves as a locking or wedge member to make possible pipe extraction as will hereinafter be explained in greater detail. This quadrant or wedge portion is welded at 15 to the rod 16 that is slidably mounted within the bore of the casing.

The lower end of the rod is tapered at 17 to facilitate the location of the pipe to be removed. Threadedly secured to the rod adjacent its tapered terminus is the finder or locator member 18 which is also of tapered contour. Abutting the upper peripheral edges of the locator member is a rubber washer 19 which will have a diameter slightly greater than the diameter of the bore of the pipe to be extracted. In order to keep the washer in abutting relation with the locator member, there is provided a lock nut 20 threaded about the rod.

The upper end of the rod has the internally threaded socket 21. Receivable therewithin is the threaded rod 22 having the eyelet 23 formed at its opposite end. As is apparent, a number of sections of the rod may have to be screw threaded one to the other, depending of course upon the depth within the well of the pipe to be extracted.

The upper extremity of the casing is enlarged at 24 and has a stepped out stop shoulder 25 that is so formed that the casing may be inserted only a predetermined distance within the pipe to be removed. As is apparent from particularly Figs. 1 and 2, the stop shoulder 25 will engage the adjacent peripheral end 26 of the pipe to be removed, thereby making it impossible for the casing to be disposed a further distance within the pipe. The upper end of the enlarged portion of the casing is provided with an internally threaded socket 27 for threaded reception therewithin of the number of threaded sections of pipe 28 that may be necessary to give the invention the required length. One section of pipe 28 is shown in Figs. 1 and 2, but as is readily apparent, it may be necessary, depending upon the depth within the well of the pipe to be removed, that additional pipe sections be provided. Pipe member 28 has welded at 29 or otherwise secured thereto the handle portion 30 to permit a raising or lowering of the casing.

As is apparent in Fig. 1, it is necessary that the eyelet 23 project above the upper face of the pipe member 28, in order that the invention will be operative.

In operation the invention is used to locate the pipe whereupon after proper alignment the casing will be extended into the bore of the pipe to be extracted until shoulder 25 abuts shoulder 26. Once this is accomplished the casing is pulled upwardly by a grasping of the handle whereupon by reason of the frictional engagement of the rubber washer with the walls defining the bore of the pipe the rod will "lag behind." This causes relative movement between the casing and the rod to which the wedge member is connected. As is apparent, the wedge member will be cammed outwardly from the position shown in Fig. 1 to that shown in Fig. 2, the peripheral edges of the wedge member riding outwardly upon the adjacent peripheral edges of the casing. At such times the casing and the wedge member firmly grip the adjacent walls of the pipe. Consequently with a further pull outwardly upon the casing the pipe will be pulled outwardly therewith. At such times as it is desired to remove the casing from wedging engagement with the pipe, it is necessary only to pull outwardly upon the rod whereupon the rod and the wedging member will move relatively to the casing and to the pipe. When the rod is pulled upwardly to such an extent that the wedging member is in the position shown in Fig. 1, the diameter of the casing member and the wedge combined will once again be less than the diameter of the bore of the pipe, and the invention may easily be withdrawn from the pipe.

In Fig. 4 a modification of the invention is shown, it comprising the casing 111, the rod 116 and two wedge members 114 and 114a. Each of the wedge members is welded at 115 to the rod or can be otherwise suitably secured thereto. In operation the modification acts in the same manner as the principal embodiment of the invention, there being two wedge members instead of one.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A pipe pulling tool comprising an elongated tube having an angular sector cut out therefrom to form an angular notch including cam surfaces inclined outwardly towards the periphery of said tube, a locking rod slidably mounted in said tube and projecting beyond both ends thereof, a wedge connected to said rod and movable therewith, said wedge comprising the cut-out sector of said tube, and friction means connected to said rod at the lower projecting end thereof operable to hold said rod while the tube is moved.

2. A pipe pulling tool comprising an elongated tube having a quadrant cut out therefrom adjacent its lower end to form an angular notch, the tube walls defining said notch being inclined from the axis towards the periphery of said tube, an elongated locking rod slidably mounted within said tube and normally projecting beyond both ends thereof, a wedge connected to said rod, said wedge comprising said cut-out quadrant, said tube having an enlarged portion located above said wedge and including a stop shoulder engageable with the peripheral end edge of the pipe to be pulled, a tapered tube locating member connected to the lower projecting end of said rod, and friction means connected to said rod and operable upon tube pulling to effect relative movement of said tube and said wedge, said friction means comprising a resilient washer having a diameter slightly greater than the bore diameter of the pipe to be pulled, said washer being contiguous to said locating member, and a lock nut retaining said washer in contiguous relation to said locating member.

References Cited in the file of this patent

UNITED STATES PATENTS

| Number | Name | Date |
|---|---|---|
| 641,895 | Scovill | Jan. 23, 1900 |
| 667,194 | Curtin | Feb. 5, 1901 |
| 832,364 | Burton | Oct. 2, 1906 |
| 1,751,789 | Brown | Mar. 25, 1930 |